(12) United States Patent
Witkewitz et al.

(10) Patent No.: US 7,115,288 B2
(45) Date of Patent: Oct. 3, 2006

(54) METHOD FOR MAKING COATED CHEWING GUM PRODUCTS WITH A COATING INCLUDING AN ALDEHYDE FLAVOR AND A DIPEPTIDE SWEETENER

(75) Inventors: David L. Witkewitz, Bridgeview, IL (US); David G. Barkalow, Deerfield, IL (US); Jonathan J. Knutsen, Brookfield, IL (US); Chungsea A. Shen, Deerfield, IL (US); Julius W. Zuehlke, Chicago, IL (US); Robert J. Yatka, Orland Park, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 119 days.

(21) Appl. No.: 10/453,862

(22) Filed: Jun. 3, 2003

(65) Prior Publication Data

US 2004/0185144 A1 Sep. 23, 2004

Related U.S. Application Data

(63) Continuation-in-part of application No. 09/591,256, filed on Jun. 9, 2000, now Pat. No. 6,572,900.

(51) Int. Cl.
A23G 3/30 (2006.01)
(52) U.S. Cl. .................................................. 426/5
(58) Field of Classification Search .................... 426/3, 426/5
See application file for complete search history.

(56) References Cited

U.S. PATENT DOCUMENTS

| | | | |
|---|---|---|---|
| 1,298,670 A | 4/1919 | Cramer | |
| 1,629,461 A | 5/1927 | Berg et al. | |
| 2,892,753 A | 6/1959 | Schmidt | |
| 2,990,328 A | 6/1961 | Lincoln | |
| 3,011,949 A | 12/1961 | Bilotti | |
| 3,029,189 A | 4/1962 | Hardy et al. | |
| 3,047,461 A | 7/1962 | Hardy et al. | |
| 3,075,884 A | 1/1963 | Bilotti et al. | |
| 3,196,172 A | 7/1965 | Wright, Jr. et al. | |
| 3,308,022 A | 3/1967 | Cummings et al. | |
| 3,498,964 A | 3/1970 | Hayashi | |
| 3,554,767 A | 1/1971 | Daum | |
| 3,590,057 A | 6/1971 | Suzuki et al. | |
| 3,845,217 A | 10/1974 | Ferno et al. | |
| 3,877,468 A | 4/1975 | Lichtneckert et al. | |
| 3,901,248 A | 8/1975 | Lichtneckert et al. | |
| 3,995,064 A | 11/1976 | Ehrgott et al. | |
| 4,154,814 A | 5/1979 | Hand et al. | |
| 4,238,475 A | 12/1980 | Witzel et al. | |
| 4,238,510 A | 12/1980 | Cherukuri et al. | |
| 4,250,195 A | 2/1981 | Cherukuri et al. | |
| 4,283,408 A | 8/1981 | Hirata et al. | |
| 4,317,838 A | 3/1982 | Cherukuri et al. | |
| 4,374,858 A | 2/1983 | Glass et al. | |
| 4,378,374 A | 3/1983 | Reggio et al. | |
| 4,386,063 A | 5/1983 | Boden | |
| 4,386,106 A | 5/1983 | Merrit et al. | |
| 4,400,372 A | 8/1983 | Muhker et al. | |
| 4,446,135 A | 5/1984 | Fountaine | |
| 4,452,821 A | 6/1984 | Gergely | |
| 4,459,311 A | 7/1984 | DeTora et al. | |
| 4,474,749 A | 10/1984 | Kruppa | |
| 4,512,968 A | 4/1985 | Komiyama et al. | |
| 4,533,556 A | 8/1985 | Piccolo et al. | |
| 4,555,407 A | 11/1985 | Kramer et al. | |
| 4,563,345 A | 1/1986 | Arrick | |
| 4,639,368 A | 1/1987 | Niazi et al. | |
| 4,647,450 A | 3/1987 | Peters et al. | |
| 4,681,766 A | 7/1987 | Huzinec et al. | |
| 4,711,774 A | 12/1987 | Denick, Jr. et al. | |
| 4,716,033 A | 12/1987 | Denick, Jr. | |
| 4,737,366 A | 4/1988 | Gergely et al. | |
| 4,753,800 A | 6/1988 | Mozda | |
| 4,753,805 A | 6/1988 | Cherukuri et al. | |
| 4,755,389 A | 7/1988 | Jones et al. | |
| 4,758,424 A | 7/1988 | Denick, Jr. et al. | |
| 4,786,511 A | 11/1988 | Huzinec et al. | |
| 4,792,453 A | 12/1988 | Reed et al. | |
| 4,822,597 A | 4/1989 | Faust et al. | |
| 4,822,816 A | 4/1989 | Markham | |

(Continued)

FOREIGN PATENT DOCUMENTS

DE 43 42 568 6/1984

(Continued)

OTHER PUBLICATIONS

"Flavor Encapsulation Technologies, Flavor Unit Sweet, Product Management", H&R (undated) (published at least before Nov. 27, 1996), 25 pages.

(Continued)

*Primary Examiner*—Arthur L. Corbin
(74) *Attorney, Agent, or Firm*—Steven P. Shurtz; Brinks Hofer Gilson & Lione

(57) ABSTRACT

A method of making coated chewing gum products comprises the steps of providing chewing gum cores; providing a first coating syrup comprising a bulk sweetener; providing an aldehyde flavor; providing a second coating syrup separate from the first coating syrup and comprising a dipeptide sweetener; and applying the first and second coating syrups to the cores and drying the syrups to produce a coating on the cores. Calcium carbonate or another antacid may be incorporated in the coating by being mixed into the first coating syrup or applied as a dry charge.

37 Claims, No Drawings

U.S. PATENT DOCUMENTS

| | | | |
|---|---|---|---|
| 4,828,820 A | 5/1989 | Glass et al. | |
| 4,832,994 A | 5/1989 | Fey | |
| 4,835,162 A | 5/1989 | Abood | |
| 4,849,227 A | 7/1989 | Cho | |
| 4,853,212 A | 8/1989 | Faust et al. | |
| 4,867,989 A | 9/1989 | Silva et al. | |
| 4,882,152 A | 11/1989 | Yang et al. | |
| 4,894,234 A | 1/1990 | Sharma et al. | |
| 4,908,211 A | 3/1990 | Paz | |
| 4,908,212 A | 3/1990 | Kwon et al. | |
| 4,929,447 A | 5/1990 | Yang | |
| 4,929,508 A | 5/1990 | Sharma et al. | |
| 4,933,184 A | 6/1990 | Tsuk | |
| 4,935,242 A | 6/1990 | Sharma et al. | |
| 4,938,963 A | 7/1990 | Parnell | |
| 4,944,949 A | 7/1990 | Story et al. | |
| 4,963,369 A | 10/1990 | Song et al. | |
| 4,968,511 A | 11/1990 | D'Amelia et al. | |
| 4,968,716 A | 11/1990 | Markham | |
| 4,971,079 A | 11/1990 | Talapin et al. | |
| 4,971,787 A | 11/1990 | Cherukuri et al. | |
| 4,975,270 A | 12/1990 | Kehoe | |
| 4,976,972 A | 12/1990 | Patel et al. | |
| 4,978,537 A | 12/1990 | Song | |
| 4,997,659 A | 3/1991 | Yatka et al. | |
| 5,013,716 A | 5/1991 | Cherukuri et al. | |
| 5,015,464 A | 5/1991 | Strobridge | |
| 5,045,325 A | 9/1991 | Lesko et al. | |
| 5,070,085 A | 12/1991 | Markham | |
| 5,110,608 A | 5/1992 | Cherukuri | |
| 5,124,156 A | 6/1992 | Shibata et al. | |
| 5,126,151 A | 6/1992 | Bodor et al. | |
| 5,139,787 A | 8/1992 | Broderick et al. | |
| 5,139,794 A | 8/1992 | Patel et al. | |
| 5,154,927 A | 10/1992 | Song et al. | |
| 5,156,842 A | 10/1992 | Mulligan | |
| 5,179,122 A | 1/1993 | Greene et al. | |
| 5,182,099 A | 1/1993 | Jonsson et al. | |
| 5,229,137 A | 7/1993 | Wolfe | |
| 5,244,670 A | 9/1993 | Upson et al. | |
| 5,284,657 A | 2/1994 | Lu et al. | |
| 5,286,500 A | 2/1994 | Synosky et al. | |
| 5,294,433 A | 3/1994 | Singer et al. | |
| 5,294,449 A | 3/1994 | Greenberg | |
| 5,340,566 A | 8/1994 | Curtis et al. | |
| 5,376,389 A | 12/1994 | Reed et al. | |
| 5,378,131 A | 1/1995 | Greenberg | |
| 5,380,530 A | 1/1995 | Hill | |
| 5,380,535 A | 1/1995 | Geyer et al. | |
| 5,397,580 A | 3/1995 | Song et al. | |
| 5,410,028 A | 4/1995 | Asami et al. | |
| 5,419,919 A | 5/1995 | Song et al. | |
| 5,433,960 A | 7/1995 | Meyers | |
| 5,445,834 A | 8/1995 | Burger et al. | |
| 5,455,286 A | 10/1995 | Amidon et al. | |
| 5,456,677 A | 10/1995 | Spector | |
| 5,487,902 A | 1/1996 | Andersen et al. | |
| 5,488,962 A | 2/1996 | Perfetti | |
| 5,494,685 A | 2/1996 | Tyrpin et al. | |
| 5,496,541 A | 3/1996 | Cutler | |
| 5,512,306 A | 4/1996 | Carlsson et al. | |
| 5,523,097 A | 6/1996 | Song et al. | |
| 5,534,272 A | 7/1996 | Bernstein | |
| 5,536,511 A | 7/1996 | Yatka | |
| 5,543,160 A | 8/1996 | Song et al. | |
| 5,554,380 A | 9/1996 | Cuca et al. | |
| 5,569,477 A | 10/1996 | Nesbitt | |
| 5,571,528 A | 11/1996 | Lee et al. | |
| 5,571,543 A | 11/1996 | Song et al. | |
| 5,576,344 A | 11/1996 | Sandler et al. | |
| 5,580,590 A | 12/1996 | Hartman | |
| 5,582,855 A | 12/1996 | Cherukuri et al. | |
| 5,585,110 A | 12/1996 | Kalili et al. | |
| 5,593,685 A | 1/1997 | Bye et al. | |
| 5,601,858 A | 2/1997 | Manshukhani | |
| 5,605,698 A | 2/1997 | Ueno | |
| 5,607,697 A | 3/1997 | Alkire et al. | |
| 5,618,517 A | 4/1997 | Miskewitz | |
| 5,628,986 A | 5/1997 | Sanker et al. | |
| 5,629,013 A | 5/1997 | Upson et al. | |
| 5,629,026 A | 5/1997 | Davis | |
| 5,629,035 A | 5/1997 | Miskewitz | |
| 5,645,853 A | 7/1997 | Winston et al. | |
| 5,651,987 A | 7/1997 | Fuisz | |
| 5,656,652 A | 8/1997 | Davis | |
| 5,665,386 A | 9/1997 | Bebet et al. | |
| 5,665,406 A | 9/1997 | Reed et al. | |
| 5,667,802 A | 9/1997 | Grimberg | |
| 5,693,334 A | 12/1997 | Miskewitz | |
| 5,698,215 A | 12/1997 | Kalili et al. | |
| 5,702,687 A | 12/1997 | Miskewitz | |
| 5,711,961 A | 1/1998 | Reiner et al. | |
| 5,716,928 A | 2/1998 | Benet et al. | |
| 5,736,175 A | 4/1998 | Cea et al. | |
| 5,744,164 A | 4/1998 | Chauffard et al. | |
| 5,753,255 A | 5/1998 | Chavkin et al. | |
| 5,756,074 A | 5/1998 | Ascione et al. | |
| 5,800,847 A | 9/1998 | Song et al. | |
| 5,824,291 A | 10/1998 | Howard | |
| 5,834,002 A | 11/1998 | Athanikar | |
| 5,846,557 A | 12/1998 | Eisenstadt et al. | |
| 5,854,267 A | 12/1998 | Berlin et al. | |
| 5,858,383 A | 1/1999 | Precopio | |
| 5,858,412 A | 1/1999 | Staniforth et al. | |
| 5,858,413 A | 1/1999 | Jettka et al. | |
| 5,858,423 A | 1/1999 | Yajima et al. | |
| 5,866,179 A | 2/1999 | Testa | |
| 5,877,173 A | 3/1999 | Olney et al. | |
| 5,882,702 A | 3/1999 | Abdel-Malik | |
| 5,889,028 A | 3/1999 | Sandborn et al. | |
| 5,889,029 A | 3/1999 | Rolf | |
| 5,897,891 A | 4/1999 | Godfrey | |
| 5,900,230 A | 5/1999 | Cutler | |
| 5,912,007 A | 6/1999 | Pan et al. | |
| 5,912,030 A | 6/1999 | Huziinec et al. | |
| 5,916,606 A | 6/1999 | Record et al. | |
| 5,922,346 A | 7/1999 | Hersh | |
| 5,922,347 A | 7/1999 | Häusler et al. | |
| 5,928,664 A | 7/1999 | Yang et al. | |
| 5,958,380 A | 9/1999 | Winston et al. | |
| 5,958,472 A | 9/1999 | Robinson et al. | |
| 5,980,955 A | 11/1999 | Greenberg et al. | |
| 5,989,588 A | 11/1999 | Korn et al. | |
| 6,024,988 A | 2/2000 | Ream et al. | |
| 6,066,342 A | 5/2000 | Gurol et al. | |
| 6,077,524 A | 6/2000 | Bolder et al. | |
| 6,090,412 A | 7/2000 | Hashimoto et al. | |
| 6,165,516 A | 12/2000 | Gudas et al. | |
| 6,190,705 B1 | 2/2001 | Richey | |
| 6,200,604 B1 | 3/2001 | Pather et al. | |
| 6,221,402 B1 | 4/2001 | Itoh | |
| 6,258,376 B1 | 7/2001 | Athanikar | |
| 6,290,985 B1 | 9/2001 | Ream et al. | |
| 6,303,159 B1 | 10/2001 | Barkalow et al. | |
| 6,322,806 B1 | 11/2001 | Ream et al. | |
| 6,350,480 B1 | 2/2002 | Urnezis et al. | |
| 6,355,265 B1 | 3/2002 | Ream et al. | |
| 6,426,090 B1 | 7/2002 | Ream et al. | |
| 6,444,241 B1 | 9/2002 | Tyrpin et al. | |
| 6,465,003 B1 | 10/2002 | Ream et al. | |
| 6,531,114 B1 | 3/2003 | Gmunder et al. | |
| 6,541,048 B1 | 4/2003 | Zyck et al. | |
| 6,551,634 B1 | 4/2003 | Joergensen | |
| 6,558,692 B1 | 5/2003 | Ream et al. | |

| | | | |
|---|---|---|---|
| 6,569,472 B1 | 5/2003 | Zyck et al. | |
| 6,572,900 B1 | 6/2003 | Zyck et al. | |
| 6,579,545 B1 | 6/2003 | Zyck et al. | |
| 6,586,023 B1 | 7/2003 | Song et al. | |
| 6,592,850 B1 | 7/2003 | Gmunder et al. | |
| 6,613,346 B1 | 9/2003 | Seielstad et al. | |
| 2002/0012633 A1 | 1/2002 | Gmunder et al. | |
| 2002/0022057 A1 | 2/2002 | Battery et al. | |
| 2002/0036445 A1 | 3/2002 | Athanikar | |

FOREIGN PATENT DOCUMENTS

| | | |
|---|---|---|
| EP | 0 202 819 A2 | 11/1986 |
| EP | 0 217 109 A2 | 4/1987 |
| EP | 0 221 850 A2 | 5/1987 |
| EP | 0 239 541 A2 | 9/1987 |
| EP | 0 273 000 A1 | 6/1988 |
| EP | 0 273 856 A1 | 7/1988 |
| EP | 0 371 584 A2 | 6/1990 |
| EP | 0 813 817 A2 | 12/1997 |
| EP | 0 273 809 B1 | 7/1998 |
| FR | 2 345 938 | 10/1977 |
| FR | 2 635 441 | 2/1990 |
| FR | 2 706 771 | 6/1993 |
| GB | 0 934 596 | 8/1963 |
| GB | 0 963 518 | 7/1964 |
| GB | 1 489 832 | 10/1977 |
| GB | 2 115 672 A | 9/1983 |
| GB | 2 181 646 A | 4/1987 |
| IT | 012173487 | 7/1997 |
| IT | 01293655 | 3/1999 |
| JP | 91-112450 | 5/1991 |
| JP | 91-251533 | 11/1991 |
| JP | 94-303911 | 11/1994 |
| JP | 96-19370 | 1/1996 |
| JP | 86/242561 | 10/1996 |
| KR | 94-2868 | 4/1994 |
| WO | WO 84/02271 | 6/1984 |
| WO | WO 90/12511 | 11/1990 |
| WO | WO 90/12583 | 11/1990 |
| WO | WO 92/06680 | 4/1992 |
| WO | WO 95/00038 | 1/1995 |
| WO | WO 95/00039 | 1/1995 |
| WO | WO 95/07621 A1 | 3/1995 |
| WO | WO 95/10290 | 4/1995 |
| WO | WO 96/00070 | 1/1996 |
| WO | WO 96/03975 | 2/1996 |
| WO | WO 97/21424 | 6/1997 |
| WO | WO 97/24036 | 6/1997 |
| WO | WO 98/23165 | 6/1998 |
| WO | WO 98/23166 | 6/1998 |
| WO | WO 98/23167 | 6/1998 |
| WO | WO 99/27798 | 6/1999 |
| WO | WO 99/33352 | 7/1999 |
| WO | WO 99/44436 | 9/1999 |
| WO | WO 00/13523 | 3/2000 |
| WO | WO 00/35296 | 6/2000 |
| WO | WO 00/35298 | 6/2000 |
| WO | WO 00/38532 | 7/2000 |
| WO | WO 02/13781 A1 | 2/2002 |

OTHER PUBLICATIONS

Dr. Massimo Calanchi and Dr. Sam Ghanta, "Taste-masking of oral formulations", *Eurand International SpA, Pharmaceutical Manufacturing International*, 1996, 5 pages.
The Eurand Group, Brochure (undated) (published at least before Nov. 27, 1996), 16 pages.
U.S. Appl. No. 09/286,818, filed Apr. 6, 1999.
U.S. Appl. No. 09/421,905, filed on Oct. 20, 1999.
U.S. Appl. No. 09/535,458, filed on Mar. 24, 2000.
U.S. Appl. No. 09/592,400, filed Jun. 13, 2000.
U.S. Appl. No. 09/621,643, filed on Jul. 21, 2000.
U.S. Appl. No. 09/621,780, filed on Jul. 21, 2000.
U.S. Appl. No. 09/631,326, filed on Aug. 3, 2000.
U.S. Appl. No. 09/653,669, filed Sep. 1, 2000.
U.S. Appl. No. 09/671,552, Sep. 27, 2000.
U.S. Appl. No. 09/747,323, filed on Dec. 22, 2000.
U.S. Appl. No. 09/990,628, filed on Nov. 13, 2001.
U.S. Appl. No. 09/992,122, filed on Nov. 13, 2001.
U.S. Appl. No. 10/024,631, filed Dec. 17, 2002.
U.S. Appl. No. 10/044,113, filed Jan. 9, 2002.
Merck Index, 11$^{th}$ Ed., #1635 "Caffeine" (1989), p. 248.
Merck Index, 12$^{th}$ Ed., #2337 "Cimetidine" (1996), p. 383.
Merck Index, 12$^{th}$ Ed., #3264 "Dimethicone" (1996), p. 544.
Merck Index, 12$^{th}$ Ed., #3972 "Famotidine" (1996), p. 667.
Merck Index, 12$^{th}$ Ed., #6758 "Nizatidine" (1996), p. 1143.
Merck Index, 12$^{th}$ Ed., #6977 "Omeprazole" (1996), p. 1174.
Merck Index, 12$^{th}$ Ed., #8272 "Rabeprazole" (1996), p. 1392.
Merck Index, 12$^{th}$ Ed., #8286 "Ranitidine" (1996), p. 1395.
James G. Elliott, "Application of Antioxidant Vitamins in Foods and Beverages" *Food Technology*, (Feb. 1999), pp. 46-48.
C. Curtis Vreeland, "Nutraceuticals Fuel Confectionery Growth" *Candy R&D*, (Mar. 1999), pp. 29, 31-32, 34-35.
Kitty Broihier, R.D., "Foods of Tomorrow, Milking The Nutrition Market", *Food Processing*, (Mar. 1999), pp. 41, 42 and 44.
Kitty Broihier, R.D., "Tea Time For Nutraceuticals, New Black, Green Tea Products Brew Up a Bevy Of Health Benefits", *Food Processing*; (Mar. 1999), 59, 61 and 63.
Andrea Allen, Jack Neff, Lori Dahm and Mary Ellen Kuhn, "Exclusive Guide to Wellness Foods and Nutraceuticals", Food Processing (Special Supplement), (Mar. 1999).
Product package. "Aspergum" distributed by Heritage Consumer Products, LLC (on sale prior to No. 27, 1995).
Product package "Chew & Sooth Zinc Dietary Supplement Gum" by Gumtech International, Inc. (undated).
Product package "Dental Care the Baking Soda Gum" distributed by Church & Dwight Co., Inc. (1998).
Product package "BreathAsure Dental Gum" distributed by Breath Asure, Inc. (1998).
Product package "Trident Advantage with Baking Soda" distributed by Warner-Lambert Co. (1998).
Product package "CHOOZ Antacid/Calcium Supplement with Calcium Carbonate" distributed by Heritage Consumer Products Co.
Heritage Consumer Products Co. article from the Internet "Cosmetics and Toiletries, The Heritage Story", printed Jul. 20, 2000,<http://www.cnewsusa.com/Connecticut/14997.html>, 1 page.
The United States Pharmacopeia The National Formulary—"General Information", dated Jan. 1, 1990 pp. 1624-1625 and pp. 1696-1697.
Gumetch article from the Internet "Customized Solutions For Customer Brands", printed Oct. 18, 2000,<http://www.gum-tech.com/cus-brands.html>, 3 pages.
Product package for Stay Alert Caffeine Supplement Gum, distributed by Amurol Confections Company (first quarter 1998).
Rabeprazole article from the Internet "Rabeprazole: Pharmacokinetics and Safety in the Elderly", printed Sep. 22, 2000, <http://www.mmhc.com/cg/articles/CH9905/Humphries.html>, 2 pages.
Brochure for "Minerals Technologies Specialty Minerals", 1998, 19 pages.
Akitoshi et al., Abstract "Acceleration of Transdermal Absorption of Pharmaceuticals by Essential Oils and Organic Solvents," Chem. Abst., 112:125228t, 1990.
Beckett, A. H. et al., "Buccal absorption of basis drugs and its application as an *in vivo* model of passive drug transfer through lipid membranes", *J. Pharm. Pharmac.*, 19 Suppl, 1967, pp. 31S-41S.
Bradford, A Rapid and Sensitive Method for the Quantification of Microgram Quantities of Protein Utilizing the Principle of Protein-Dye Binding, Analytical Biochemistry, 72:248-254 (1976).
Nielsen et al., P-Glycoprotein as Multidrug Transporter: A Critical Review of Current Multidrug Resistant Cell Lines, Chimica et Biophysica Acta., 1139:169-183 (1992).
Adams, M.W., d-Alpha Tocopheryl Polyethylene glycol 1000 Succinate (Eastman vitamin E TPGS) as an Emulsifier and Bioenhancer for Drugs and Lipophilic Compounds, 6th International Conference on Pharmaceutical Technology, Paris, Jun. 2-4, 1992.

Chang, Tammy et al., "The Effect of Water-Soluble Vitamin E on Cyclosporine Pharmacokinetics in Healthy Volunteers," Abstract in American Socitey to Clinical Pharmacology and Therapeutics, 57(2):163, Feb. 1995.

Hebert, Mary F. et al.; "Bioavailability of Cyclosporine with Concomitant Rifampin Administration is Markedly Less Than Predicted by Hepatic Enzyme Induction" (1992) *Clin. Pharmacol. Ther.* 52:453-457.

Kronbach, Thomas et al.; "Oxidation of Midazolam and Triazolam by Human Liver Cytochrome P450IIIA4" (1989) *Molec. Pharm.* 36:89-96.

Lalka et al.; "The Hepatic First-Pass Metabolism of Problematic Drugs" (1993) *J. Clin. Pharmacol.* 33:657-669.

Lum et al.; "Clinical Trials of Modulation of Multidrug Resistance. Pharmacokinetic and Pharmacodynamic Considerations" (1993) *Cancer* 72:3502-3514.

Muranishi, Shozo; "Absorption Enhancers" (1990) *Crit. Rev. Ther. Drug Carrier Sys.*, 7:1-33.

Somberg et al.; "The Clinical Implications of First-Pass Metabolism: Treatment Strategies for the 1990's" (1993) *J. Clin. Pharmacol.* 33:670-673.

Tam, Yun K.; "Individual Variation in First-Pass Metabolism" (1993) *Clin. Pharmacokinet.* 25:300-328.

Van Hoogdalem et al.; "Intestinal Drug Absorption Enhancement: An Overview" (1989) *Pharmacol. Ther.* 44:407-443.

Warren et al.; "Increased Accumulation of Drugs in Multidrug-Resistant Cell Induced by Liposomes" (1992) *Cancer Research* 52:3241-3245.

Watkins, Paul B.; "The Role of Cytochromes P-450 in Cyclosporine Metabolism" (1990) *J. Am. Acad. Dermacol.* 23::1301-1309.

Weinberg, David S. et al. "Sublingual absorption of selected opioid analgesics", *Clin. Pharmacol Ther.*, 1998, vol. 44, pp. 335-342.

Wrighton et al.; "In Vitro Methods for Assessing Human Hepatic Drug Metabolism: Their Use in Drug Development" (1993) 25:453-484.

Wu et al.; "Use of IV and Oral Drug Levels from Cyclosporene (CsA) with Concomitant Rifampin to Differentiate Gut Absorption and Metabolism" (1993) *Pharm. Res.* 10: abstract ppdm8185.

Zamora et al.; "Physical-Chemical Properties Shared by Compounds that Modulate Multidrug Resistance in Human Loukemic Cells" (1988) *Molec. Pharmacol.* vol. 33, pp. 454-462.

METHOD FOR MAKING COATED CHEWING GUM PRODUCTS WITH A COATING INCLUDING AN ALDEHYDE FLAVOR AND A DIPEPTIDE SWEETENER

REFERENCE TO EARLIER FIELD APPLICATION

The present application is a continuation-in-part of U.S. patent application Ser. No. 09/591,256, filed Jun. 9, 2000, now U.S. Pat. No. 6,572,900, which is incorporated by reference.

BACKGROUND OF THE INVENTION

The present invention relates to methods for producing coated chewing gum products. More particularly, the invention relates to producing coated chewing gum products containing flavor and a dipeptide sweetener in the coating. Preferably, an antacid is also added to the chewing gum coating such that it will have a fast release from chewing gum for maximum effectiveness.

Coated chewing gum products are well known. Many prior art patents disclose chewing gum products coated with sugar sweeteners or polyol sweeteners. U.S. Pat. No. 4,317,838, for example, discloses a method of applying a sugarless coating to chewing gum. The coating may include calcium carbonate as an anti-sticking agent. Synthetic sweeteners, including many different high-intensity sweeteners, are also suggested for use in the coating.

It has been discovered that some high-intensity sweeteners, particularly aspartame (APM), are unstable and degrade while in the coating syrup. Often the coating syrup is made in advance and held at an elevated temperature for several hours until it is used. This problem was identified earlier and addressed in copending application Ser. No. 09/591,256, now issued as U.S. Pat. No. 6,572,900.

Another area of interest is the use of medicaments in chewing gum. In certain embodiments, it is contemplated that an active medicament that is added to the chewing gum is generally released very readily. An active medicament may be added to the gum coating, which is a water soluble matrix, such that during the chewing period, the medicament may be released quickly, resulting in a fast release. This would allow a chewing gum coating to be a carrier for an active medicament with these fast release characteristics.

It is of course known to provide active medicaments to individuals for various purposes. These medicaments can be used to treat diseases and as such are typically referred to as drugs or medicaments. Likewise, the drugs or medicaments can be used for preventative purposes. Still, it is known to provide medicaments to an individual for a variety of non-medical purposes including enhancing performance or maintaining health.

There are a great variety of such medicaments. These medicaments run the gamut from stimulants such as caffeine to drugs such as analgesics, tranquilizers and cardiovascular products, as well as vitamins, minerals, and supplements. Some such medicaments, such as antacids, are taken on an "as needed" basis while other medicaments must be taken at regular intervals by the individual.

Antacids are used to relieve gastrointestinal disturbances. These antacids are generally insoluble inorganic salts such as calcium carbonate, magnesium carbonate, calcium hydroxide, magnesium hydroxide, or aluminum hydroxide. These antacids readily neutralize acids in the GI tract and are commonly available in or as antacid tablets.

Previously, antacids have been added to chewing gum and in a chewing gum coating, but have not been totally consumer acceptable. The large amount of active antacid needed for effectiveness did not lend itself to giving a good tasting product. Also, the presence of sugar in the antacid chewing gum or coated on the chewing gum was not consumer acceptable. However, new types of sugarless coated chewing gum preparations with high-intensity sweeteners and quality flavors can be effective to make new antacid-type chewing gum preparations that can be more consumer acceptable.

It has been found that by adding the antacid to a gum coating, the antacid is quickly released from the chewing gum into saliva and into the gastrointestinal (GI) tract. However, one of the difficulties that has been encountered in adding an antacid to a chewing gum coating is that the antacid, being basic, raises the pH of the coating syrup. This has been found to exacerbate the problem mentioned above regarding degradation of some high-intensity sweeteners used in coating syrups.

Some high-intensity sweeteners, particularly dipeptide sweeteners such as aspartame and alitame, are not stable in the presence of aldehyde flavors. These flavors decompose the sweeteners so that they lose their sweetness potency. The sweeteners that may be included in the coating may thus be degraded when flavors are also added to a coating.

Thus, there is a need for a way to make coated chewing gum products that include aldehyde flavor and high-intensity sweeteners in the coating and that allows the high-intensity sweetener to be well distributed in the coating but avoids any degradation of unstable high-intensity sweeteners. It would especially be an improvement if an antacid could also be included in the chewing gum coating without causing degradation of the high-intensity sweeteners.

SUMMARY OF THE INVENTION

It has been found that if a high-intensity sweetener is mixed into a separate coating syrup from the main coating syrup that needs to be held at an elevated temperature, the separate syrup does not need to be heated and the high-intensity sweetener has less degradation. An aldehyde flavor can be added with the main coating syrup. Also, an antacid, like calcium carbonate, can be added to the main coating syrup and thus be included in the gum coating without exacerbating a problem of the high-intensity sweetener degradation.

In a first aspect, the invention is a method of making coated chewing gum products comprising the steps of: providing chewing gum cores; providing a first coating syrup comprising a bulk sweetener; providing a second coating syrup separate from the first coating syrup and comprising a dipeptide sweetener; providing an aldehyde flavor; and applying the first and second coating syrups to the cores, the flavor being applied with first coating syrup, and drying the syrups to produce a coating on the cores.

In a second aspect, the invention is a method of making coated chewing gum products comprising the steps of, providing chewing gum cores; providing a first coating syrup comprising a bulk sweetener and holding the first coating syrup at an average temperature of at least 100° F. (38° C.); providing an aldehyde flavor; providing a second coating syrup containing a dipeptide sweetener separate from the first coating syrup and holding the second coating syrup at an average temperature of less than 90° F. (32° C.); applying the first and second coating syrups to produce a coating on the cores, and applying the aldehyde flavor so that it is separated from the second coating syrup by one or more dried layers of first syrup constituting at least 2% by weight the core.

In a third aspect, the invention is a method of making coated chewing gum products comprising the steps of providing chewing gum cores; providing a first coating syrup comprising a bulk sweetener; providing an aldehyde flavor; providing a second coating syrup separate from the first coating syrup and comprising a dipeptide sweetener; applying the first and second coating syrups to produce a chewing gum coating, and applying the aldehyde flavor so that it is separated from the second coating syrup by one or more dried layers of first syrup constituting at least 2% by weight of the core.

By applying the aldehyde flavors with coating layers separated from coating layers containing dipeptide sweeteners, the dipeptide sweeteners are protected from degradation due to the flavor. The use of an antacid in the coating without causing degradation of the dipeptide sweetener is also possible. In addition, it has been found that low levels of calcium carbonate in the coating are useful for reasons other than an antacid effect. In a malitol coating, added calcium carbonate helps to reduce chipping of the final pellet coating. In a xylitol coated product, added calcium carbonate gives an improved pellet crunch. Other improvements in crunch, smoothness and shelf life may be found when other polyols are used for a coated chewing gum.

DETAILED DESCRIPTION OF THE PREFERRED EMBODIMENTS

The method of the present invention involves the use of at least two separate coating syrups. The first syrup will include a bulk sweetener. The second syrup will include a high-intensity dipeptide sweetener. Additional coating syrups may also be used, such as finishing syrups, which also include a bulk sweetener. The aldehyde flavor may be applied with the first syrup or separately. When an antacid is to be included in the coating, it will preferably be included in the first coating syrup. Preferably the first coating syrup is essentially free of dipeptide sweeteners, meaning that the syrup does not contain any, or contains such a low amount of dipeptide sweetener that the dipeptide sweetener does not provide a perceptible additional sweetness.

The first and second coating syrups are applied to chewing gum cores to form the coated chewing gum product. The application can be sequential or simultaneous. Simultaneous application includes applying the two syrups at the same time through different application mechanisms, or premixing the syrups and applying them through a common application mechanism. The preferred application method includes applying the syrups separately, but alternately. For example, one of the coating syrups may be applied both before and after the application of the other coating syrup. Specifically, the first coating syrup may be applied, followed by application of the second coating syrup, followed by further application of the first coating syrup.

This type of application will generally mean that the coating syrups are held in separate tanks from the time they are prepared until they are applied to the cores. If the syrups are mixed and applied together they should preferably be mixed just prior to being applied to the chewing gum cores. The amount of time that they may be mixed before application will depend on the rate that the high-intensity sweetener degrades. Preferably they will be mixed for less than about 30 minutes prior to application.

Preferably the first coating syrup is held for use at an average temperature of at least 100° F. (38° C.), more preferably at least 130° F. ((54° C.) and most preferably at an average temperature of at least 150° F. (66° C.). The average holding time between preparation and application of the first coating syrup will preferably be at least two hours, more preferably at least four hours. Average holding times and temperatures take into account the fact that coating syrups are usually made in batches and used up over a period of time. For example, if a coating syrup were made at 8:00 a.m., and used at a steady rate from 9:00 a.m. to 5:00 p.m., the average holding time would be five hours. The second coating syrup is preferably held at an average temperature of less than 90° F. (32° C.) and for an average period of less than 4 hours.

The second coating syrup will preferably also include a bulk sweetener at a lower level than in the first coating syrup. It may also include other high-intensity sweeteners in addition to one or more dipeptide sweeteners. To make a preferred second coating syrup, a high-intensity sweetener is blended in a syrup with a portion of a bulk sweetener, preferably a polyol. Preferably the sweeteners in the second syrup are used at a ratio of about 5:1 to about 1:5, more preferably about 1:1, high-intensity sweetener: bulk sweetener. The second coating syrup may preferably be about 50% solids and be held at room temperature. Since aspartame is not highly soluble at room temperature, the preferred second coating syrup is a solution of the polyol with aspartame suspended in water. A coating syrup that includes undissolved compounds is referred to as a suspension syrup.

As mentioned above, products made by the present invention may preferably include an antacid, such as calcium carbonate. The antacid will preferably be included as part of the first coating syrup. A typical first syrup may contain a polyol, calcium carbonate and whitener, and a typical second syrup may contain the dipeptide sweetener and a polyol, but no calcium carbonate. This keeps the coating syrup containing calcium carbonate separate from the coating syrup containing aspartame. Once the coating syrups are applied and dried, degradation of aspartame is eliminated or substantially reduced.

For antacid chewing gum products, calcium carbonate is the most preferred antacid material. This is mostly due to the fact that the most common inert filler in chewing gum base is calcium carbonate. Calcium carbonate, along with talc, which is used in talc bases that are used for some types of gum products that use food acids to give tartness to flavors, have been used as fillers in gum base and gum products for many years.

Chewing gum bases that contain calcium carbonate do not readily release their calcium carbonate during chewing. Since calcium carbonate (or in other cases talc) is very water insoluble, it releases from gum either very slowly or over extended chewing. As a result, this calcium carbonate is not effective as an antacid. Generally, when calcium carbonate is added to a gum formulation separate from the gum base, calcium carbonate becomes intimately mixed with the base during chewing and also does not release. However, when calcium carbonate is used in the coating of the chewing gum, it does become available in the oral cavity and is ingested to be an effective antacid.

In the past, suspension coatings with calcium carbonate for an antacid gum were made with sugar. Sugar with its naturally sweet taste masked some of the off-taste due to the use of high levels of calcium carbonate. With the advent of new coating technologies using less sweet sugarless polyols instead of sugar, the sweet taste of the coating is significantly reduced. In some coatings where xylitol is used, it is sufficiently sweet as a coating, but other polyols such as maltitol, hydrogenated isomaltulose, sorbitol, or erythritol, are not. When the coating contains high levels of calcium carbonate, all of the polyols lack sufficient sweetness to give a good tasting product. As a result, high-intensity sweeteners need to be added to the coating containing calcium carbonate to give a high-quality, consumer-acceptable product.

Use of high levels of calcium carbonate of greater than about 10% in a suspension coating, preferably greater than about 15% in a suspension coating, causes an increase of the pH of the suspension coating solution. At pH's of about 6 and higher, many of the high-intensity sweeteners such as acesulfame K, sucralose, saccharin, cyclamates, glycyrrhizin, or thaumatin are stable in this type of suspension, but dipeptide sweeteners such as aspartame (commonly sold under the tradename Nutrasweet), alitame and neotame, are less stable. For example, a maltitol coating syrup containing: 64% maltitol, 19.5% solution of gum arabic, 0.5% titanium dioxide, 0.35% aspartame, and 15.65% water has a pH of 4.8. When stored at 167° F. (75° C.) for 7 hours, 11% aspartame is lost. When 11% of the maltitol is replaced with calcium carbonate, the pH increases to 6.0, and when stored at 167° F. (75° C.) for 7 hours, 80% of the aspartame is lost. Even when coating syrups with aspartame, but without an antacid like calcium carbonate, are held for many hours before use, aspartame is lost. The invention will be most useful when the high-intensity sweetener is one that degrades by at least 5% if mixed into a syrup and held at 167° F. (75° C.) for 7 hours. The dipeptide sweeteners are particularly subject to such degradation.

For coated antacid chewing gum type products, the high level of calcium carbonate or other antacid in the coating modifies the taste quality and gum texture. The addition of high-intensity sweeteners to the gum coating improves the taste of the finished product. This also occurs in sugar coated gums as well as polyol coated gums, so aspartame or other high-intensity sweeteners may also be added to sugar coated gums with calcium carbonate or other antacids.

The flavor may be added to the coating either between coats or along with the coating syrup. The flavor may be mixed into the main coating syrup, but more typically it will be held separately. In that case, it can be applied separately but at the same time, or be applied between aliquots of the main coating syrup. Most preferably the flavor will be added while the first coating syrup is still wet. The aqueous coating syrup containing sugar or a polyol is applied as a hot concentrated syrup, which quickly cools, crystallizes and is then dried. While the syrup is in the process of wetting the gum core, a low level of liquid, oil-type flavors may be added, and allowed to dry with the coating. After applying the flavor coat, additional non-flavored syrup coatings are applied to cover the flavor, which may be volatile, to prevent further loss of flavor due to air drying.

Natural and synthetic flavors comprise many flavor compounds. Some flavors such as mint contain low amounts of aldehydes, but these are not considered to be aldehyde flavors. Other flavors, however, contain large amounts of aldehyde ingredients. Some of these use: cinnamic aldehyde in cinnamon, benzaldehyde in cherry, vanallin in vanilla, citral in lemon flavors, acetaldehyde, octanal, and decanol in orange flavors, heptanal in strawberry, apple or grape, or isovaleraldehyde in peach. These flavors can degrade dipeptide sweeteners very quickly. In addition the one or more aldehyde flavors, the flavor added to the coating may contain other flavors. For example, a cherry-mint flavor may be added to the coating.

In the present invention, the dipeptide sweetener syrup should be applied at least three coats separate from the flavor application. Preferably, the dipeptide sweetener syrup should be applied at least five coats from the flavor application. For example, if an aspartame sweetened syrup is applied at coats 13–16, flavor may be added at coats 20 and 25. Alternating coats may be used, such as the dipeptide sweetener syrup at coats 5, 15 and 25, and the flavor at coats 10, 20, and 30. Many variations of this process are included in this invention depending on the level of sweetener or level of flavor required. Of course, if a person wanted to they could add an extra amount of dipeptide sweetener and let some of it contact the aldehyde flavor and thus degrade. However, in the preferred embodiment, all of the dipeptide sweetener is applied in coating layers separated from the aldehyde flavor. It is preferred that the aldehyde flavor is separated from the syrup with the dipeptide sweetener by dried coating material that constitutes about 2% or more by weight of the core, more preferably about 3% or more by weight of the core. In many coating operations, each coating layer of syrup will deposit roughly 1% by weight of the core.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, softeners and inorganic fillers. The gum base may or may not include wax. The insoluble gum base can constitute approximately 5% to about 95% by weight of the chewing gum, more commonly the gum base comprises 10% to about 50% of the gum, and in some preferred embodiments approximately 25% to about 35% by weight, of the chewing gum. In pellet gum center formulations, the level of insoluble gum base may be much higher.

In a particular embodiment, the chewing gum base of the present invention contains about 20% to about 60% by weight synthetic elastomer, about 0% to about 30% by weight natural elastomer, about 5% to about 55% by weight elastomer plasticizer, about 4% to about 35% by weight filler, about 5% to about 35% by weight softener, and optional minor amounts (about 1% or less by weight) of miscellaneous ingredients such as colorants, antioxidants, etc.

Synthetic elastomers may include, but are not limited to, polyisobutylene with GPC weight average molecular weights of about 10,000 to about 95,000, isobutylene-isoprene copolymer (butyl elastomer), styrene-butadiene, copolymers having styrene-butadiene ratios of about 1:3 to about 3:1, polyvinyl acetate having GPC weight average molecular weights of about 2,000 to about 90,000, polyisoprene, polyethylene, vinyl acetate-vinyl laurate copolymers having vinyl laurate contents of about 5% to about 50% by weight of the copolymer, and combinations thereof.

Preferred ranges are: 50,000 to 80,000 GPC weight average molecular weight for polyisobutylene; 1:1 to 1:3 bound styrene-butadiene for styrene-budadiene; 10,000 to 65,000 GBC weight average molecular weight for polyvinyl acetate, with the higher molecular weight polyvinyl acetates typically used in bubble gum base; and a vinyl laurate content of 10–45% for vinyl acetate-vinyl laurate.

Natural elastomers may include natural rubber such as smoked or liquid latex and guayule, as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters or partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water-insoluble gum base portion, a typical chewing gum composition includes a water-soluble bulk portion and one or more flavoring agents. The water-soluble portion can include bulk sweeteners, high-intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5% to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute about 5% to about 95% by weight of the chewing gum, more typically, about 20% to about 80% by weight, and more commonly, about 30% to about 60% by weight of the gum. Sugar sweeteners generally include saccharide-containing components commonly known in the chewing gum art, including but not limited to, sucrose, dextrose, maltose, dextrin, dried invert sugar, fructose, galactose, corn syrup solids, and the like, alone or in combination. Sugarless sweeteners include, but are not limited to, sugar alcohols such as sorbitol, mannitol, xylitol, hydrogenated starch hydrolysates, maltitol, and the like, alone or in combination.

High-intensity artificial sweeteners can also be used, alone or in combination, with the above. Preferred sweeteners include, but are not limited to, sucralose, aspartame, N-substituted APM derivatives such as neotame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; oligo fructose (Raftilose); inulin (Raftilin); fructooligosaccharides (NutraFlora); palatinose oligosaccharide; guar gum hydrolysate (BeneFiber); or indigestible dextrin (Fibersol). However, other low calorie bulking agents can be used.

A variety of flavoring agents can also be used, if desired. The flavor can be used in amounts of about 0.1 to about 15 weight percent of the gum, and preferably, about 0.2% to about 5% by weight. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

In general, chewing gum is manufactured by sequentially adding the various chewing gum ingredients to a commercially available mixer known in the art. After the ingredients have been thoroughly mixed, the gum mass is discharged from the mixer and shaped into the desired form such as rolling sheets and cutting into sticks, extruding into chunks or casting into pellets, which are then coated or panned.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further parts of the bulking agent are added to the mixer. Flavoring agents are typically added with the final portion of the bulking agent. Other optional ingredients are added to the batch in a typical fashion, well known to those of ordinary skill in the art.

The entire mixing procedure typically takes from five to fifteen minutes, but longer mixing times may sometimes be required. Those skilled in the art will recognize that many variations of the above described procedure may be followed.

After the ingredients are mixed, the gum mass is formed into pellets or balls. Pellet or ball gum is prepared as conventional chewing gum but formed into pellets that are pillow shaped, or into balls. The pellets/balls are used as cores for the coated product. The cores can be sugar or polyol coated or panned by conventional panning techniques to make a unique coated pellet gum. The weight of the coating may be about 20% to about 50% of the weight of the finished product, but may be as much as 75% of the total gum product.

Conventional panning procedures generally coat with sucrose, but recent advances in panning have allowed use of other carbohydrate materials to be used in place of sucrose. Some of these components include, but are not limited to, sugars such as dextrose, maltose, palatinose, and lactitol; or sugarless bulk sweeteners such as xylitol, sorbitol, hydrogenated isomaltulose, erythritol, maltitol, and other new polyols (also referred to as alditols) or combinations thereof. The coating may thus be a sugar coating or sugarless. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetables gums like alginates, locust bean gum, guar gum, and gum tragacanth, insoluble carbonates like calcium carbonate or magnesium carbonate and talc. Antitack agents may also be added as panning modifiers, which allow the use of a variety of carbohydrates and sugar alcohols to be used in the development of new panned or coated gum products. Flavors may also be added with the sugar or sugarless coating to yield unique product characteristics.

Another type of pan coating could also be used to complete the coating process. This technique is referred to as a film coating and is more common for pharmaceuticals than in chewing gum, but procedures are similar. A polymer like shellac, zein, or cellulose type material is applied onto a pellet-type product forming a thin film on the surface of the product. The film is applied by mixing the polymer, plasticizer and a solvent (pigments are optional) and spraying the mixture onto the pellet surface. This is done in conventional type panning equipment, or in more advanced side-vented coating pans. When a solvent like an alcohol is used, extra precautions are needed to prevent fires and explosions, and specialized equipment must be used.

Some film polymers can use water as the solvent in film coating. Recent advances in polymer research and in film coating technology eliminates the problem associated with the use of solvents in coating. These advances make it possible to apply aqueous films to a pellet or chewing gum product. The high-intensity sweetener can also be dissolved or suspended in the aqueous solvent and coated on the surface with the aqueous film.

After a coating film with a sweetener is applied to a chewing gum product, a hard shell sugar or polyol coating may then be applied over the film coated product. In some instances a soft shell sugar or polyol coating may also be used over the film coated product. The level of film coating applied to a pellet gum may be generally about 0.5% to about 3% of the gum product. The level of overcoating of the hard or soft shell may be about 20% to about 60%. When the high-intensity sweetener is added with the film coating and not with the sugar/polyol coating, better control of the amount of high-intensity sweetener in the product may be obtained.

As noted above, the coating may contain ingredients such as flavoring agents, as well as dispersing agents, coloring agents, film formers and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, vanilla, cinnamic aldehyde, oil of wintergreen, anise and the like. The flavoring agents may be used in an amount such that the coating will contain from about 0.1% to about 3% flavoring agent, and preferably from about 0.3% to about 2.0% flavoring agent.

High-intensity sweeteners contemplated for use in the coating include but are not limited to synthetic substances, saccharin, thaumatin, alitame, saccharin salts, aspartame, N-substituted APM derivatives such as neotame, sucralose and acesulfame-K. The high-intensity sweetener may be added to the coating syrup in an amount such that the coating will contain from about 0.01% to about 2.0%, and preferably from about 0.1% to about 1.0% high-intensity sweetener. Preferably the high-intensity sweetener is not encapsulated.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1% to about 1.0%, and preferably from about 0.3% to about 0.6% of the agent.

When low or high amounts of calcium carbonate or other antacid is used, the calcium carbonate is dispersed or suspended in the coating syrup that contains the sugar or polyol. Generally, as calcium carbonate is increased, the sugar or polyol is decreased. Levels of calcium carbonate used may be as low as 5% of the total solids or as high as 50% of the total solids in the syrup, and more preferably will comprise about 10% to about 40% of the total solids.

Coloring agents are preferably added directly to the syrup in the dye or lake form. Coloring agents contemplated by the present invention include food quality dyes. Film formers preferably added to the syrup include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, gum talha (another type of acacia), alginate, cellulosics, vegetable gums and the like.

The coating is initially present as a liquid syrup which contains from about 30% to about 80% or 85% of the coating ingredients previously described herein, and from about 15% or 20% to about 70% of a solvent such as water. In general, the coating process is carried out in a rotating pan. Sugar or sugarless gum center tablets to be coated are placed into the rotating pan to form a moving mass.

The material or syrup which will eventually form the coating is applied or distributed over the gum center tablets. Once the coating has dried to form a hard surface, additional syrup additions can be made to produce a plurality of coatings or multiple layers of hard coating.

In a hard coating panning procedure, syrup is added to the gum center tablets at a temperature range of from about 100° F. (38° C.) to about 240° F. (116° C.). Preferably, the syrup temperature is from about 130° F. (54° C.) to about 200° F. (94° C.) throughout the process in order to prevent the polyol or sugar in the syrup from crystallizing. The syrup may be mixed with, sprayed upon, poured over, or added to the gum center tablets in any way known to those skilled in the art.

In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75–100 coats are applied to the gum center tablets. The present invention contemplates applying an amount of syrup sufficient to yield a coated comestible containing about 10% to about 65% coating.

Those skilled in the art will recognize that in order to obtain a plurality of coated layers, a plurality of premeasured aliquots of coating syrup may be applied to the gum center tablets. It is contemplated, however, that the volume of aliquots of syrup applied to the gum center tablets may vary throughout the coating procedure.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 70° F. (21° C.) to about 115° F. (46° C.). More preferably, the drying air is in the temperature range of from about 80° F. (27° C.) to about 100° F. (38° C.). The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around or through the bed of the syrup coated gum centers at a flow rate, for large scale operations, of about 2800 cubic feet per minute. If lower quantities of material are being processed, or if smaller equipment is used, lower flow rates would be used.

The present invention also contemplates the application of powder material after applying an aliquot of coating syrup to help build up the coating.

For many years, flavors have been added to a sugar coating of pellet gum to enhance the overall flavor of gum. These flavors include spearmint flavor, peppermint flavor, wintergreen flavor, and fruit flavors. These flavors are generally preblended with the coating syrup just prior to applying it to the core or added together to the core in one or more coating applications in a revolving pan containing the cores. Generally, the coating syrup is very hot, about 130° F. (54° C.) to 200° F. (93° C.), and the flavor may volatilize if preblended with the coating syrup too early.

The first coating syrup is preferably applied to the gum cores as a hot liquid, the sugar or polyol allowed to crystallize, and the coating then dried with warm, dry air. As noted above, the second coating syrup is preferably held at ambient temperature, and can be applied simultaneous or sequentially with the first coating syrup. Aliquots of both syrups are preferably applied in about 30 to 80 applications to obtain a hard shell coated product having an increased weight gain of about 25% to 75%. A flavor is applied with one, two, three or even four or more of these coating applications. Each time flavor is added, several non-flavored coatings are applied to cover the flavor before the next flavor coat is applied. This reduces volatilization of the flavor during the coating process. As noted above, the syrup containing the dipeptide sweetener should not be applied either just before or just after the flavor has been applied when the flavor contains an aldehyde, but rather at least three coats of the first syrup should be applied before and after the application of the aldehyde flavor.

For mint flavors such spearmint, peppermint and wintergreen, some of the flavor components are volatilized, but sufficient flavor remains to give a product having a strong, high impact flavor. Fruit flavors, that may contain esters or aldehydes, are more easily volatilized and may be flammable and/or explosive and therefore, care should be taken when used in coatings.

EXAMPLES

The following examples of the invention are provided by way of explanation and illustration.

As noted earlier, the gum formulas can be prepared as sugar or sugarless type formulations and made in a pellet or pillow shape or a round ball or any other shape of product for coating/panning. However, gum formulas for pellet centers are generally adjusted to a higher level of gum base to give a more consumer acceptable size of gum bolus.

Keeping this in mind, if a coating of about 25% of the total product is added to a pellet core as sugar or polyols, the gum base in the pellet core should also be increased by 25%. Likewise, if a 33% coating is applied, the base levels should also be increased by 33%. As a result, gum centers are usually formulated with about 25% to about 50% gum base with a corresponding decrease in the other ingredients except flavor. Even higher levels of base may be used when calcium carbonate or another antacid is added to a pellet coating. Generally flavor levels in the gum increase with the level of gum base as the base tends to bind flavors into the gum and more flavor is needed to give a good flavorful product. However flavors can also be added to the coating to give increased flavor impact and more flavor perception.

A wide range of changes and modifications to the embodiments of the invention described above will be apparent to persons skilled in the art. For example, while the invention is described with respect to hard-coated chewing gum, it will be appreciated that the process is applicable to coating comestibles including other food products, such as candies or other confectionaries, as well as other orally ingested products such as pharmaceuticals, in which a coating with a high-intensity sweetener would have utility.

Some typical sugar type gum center formulations are shown in Table 1 that can be used as centers that are coated with calcium carbonate to give an effective antacid.

TABLE 1

| | (WEIGHT PERCENT) | | | | | |
|---|---|---|---|---|---|---|
| | EX. 1 | EX. 2 | EX. 3 | EX. 4 | EX. 5 | EX. 6 |
| SUGAR | 48.0 | 48.0 | 46.0 | 40.0 | 39.0 | 36.0 |
| GUM BASE | 30.0 | 35.0 | 40.0 | 30.0 | 35.0 | 40.0 |
| CORN SYRUP | 20.0 | 15.0 | 12.0 | 18.0 | 14.0 | 12.0 |
| GLYCERIN | 1.0 | 1.0 | 1.0 | 1.0 | 1.0 | 1.0 |
| FLAVOR | 1.0 | 1.0 | 1.0 | 1.0 | 1.0 | 1.0 |
| DEXTROSE MONOHYDRATE | — | — | — | 10.0 | 10.0 | 10.0 |

Higher levels of base may be used with a corresponding decrease in other ingredients. Also, other sugars may be used in the gum center.

Calcium carbonate can then be used in the coating formula on the various pellet gum formulations. The following Table 2 shows some sugar and dextrose type formulas: Using a 1 gram center, the levels of calcium carbonate in the following tables will give 250–800 mg per 1 or 2 pieces in 1.5–3.0 gram pieces with 33% to 66% coating.

TABLE 2

(DRY WEIGHT PERCENT)

|  | EX. 7 | EX. 8 | EX. 9 | EX. 10 | EX. 11 | EX. 12 |
|---|---|---|---|---|---|---|
| SUGAR* | 97.0 | 95.3 | 94.0 | 72.3 | 66.0 | 54.8 |
| GUM ARABIC | 2.0 | 3.0 | 4.0 | 2.0 | 3.0 | 4.0 |
| TITANIUM DIOXIDE | 0.5 | 1.0 | 1.0 | — | — | — |
| CALCIUM CARBONATE | — | — | — | 25.0 | 30.0 | 40.0 |
| CINNAMON FLAVOR | 0.3 | 0.5 | 0.8 | — | — | — |
| CHERRY FLAVOR | — | — | — | 0.5 | 0.8 | 1.0 |
| WAX | 0.1 | 0.1 | 0.1 | 0.1 | 0.1 | 0.1 |
| ASPARTAME* | 0.1 | 0.1 | 0.1 | 0.1 | 0.1 | 0.1 |

|  | EX. 13 | EX. 14 | EX. 15 | EX. 16 |
|---|---|---|---|---|
| DEXTROSE MONOHYDRATE* | 97.4 | 95.2 | 73.0 | 56.3 |
| GUM ARABIC | 1.5 | 3.0 | 1.5 | 3.0 |
| TITANIUM DIOXIDE | 0.5 | 1.0 | — | — |
| CALCIUM CARBONATE | — | — | 25.0 | 40.0 |
| CINNAMON FLAVOR | 0.3 | 0.5 | 0.2 | 0.4 |
| CHERRY FLAVOR | — | — | — | — |
| WAX | 0.1 | 0.1 | 0.1 | 0.1 |
| ASPARTAME* | 0.2 | 0.2 | 0.2 | 0.2 |

*A 1:1 sugar/aspartame syrup is prepared separately.
*A 1:1 dextrose monohydrate/aspartame syrup is prepared separately.

The above formulations are made by making a first coating syrup by dissolving the sugar and gum arabic in solution at about 75% solids at boiling, and suspending titanium dioxide and/or calcium carbonate in this syrup. Flavor is not mixed with the hot syrup, but added at low levels with coats 10, 20 and 30. The sugar/aspartame and dextrose monohydrate/aspartame syrups are applied with coats 15 and 25. After the final coats are applied and dried, wax is applied to give a smooth polish.

The above process gives a hard shell coating. Often a dry charge of powdered sugar or dextrose monohydrate may be used. This gives a somewhat softer coating. A dry charge may be used to build up a coating, but then finished with a straight syrup to obtain a hard shell. Table 3 gives these types of formulas.

TABLE 3

(DRY WEIGHT PERCENT)

|  | EX. 17 | EX. 18 | EX. 19 | EX. 20 | EX. 21 | EX. 22 |
|---|---|---|---|---|---|---|
| SUGAR** | 87.4 | 50.8 | — | — | 87.4 | — |
| DEXTROSE MONOHYDRATE** | — | — | 87.2 | 51.0 | — | 41.8 |
| POWDER SUGAR* | 10.0 | 5.0 | — | — | — | — |
| POWDER DEXTROSE* | — | — | 10.0 | 5.0 | — | 5.0 |
| GUM ARABIC POWDER* | 2.0 | 3.0 | 2.0 | 3.0 | 8.0 | 8.0 |
| GUM ARABIC SOLUTION | — | — | — | — | 4.0 | 4.0 |
| CINNAMON FLAVOR | 0.4 | — | 0.4 | — | 0.4 | — |
| CHERRY FLAVOR | — | 1.0 | — | 0.6 | — | 0.8 |
| WAX | 0.1 | 0.1 | 0.1 | 0.1 | 0.1 | 0.1 |
| CALCIUM CARBONATE | — | 40.0 | — | 40.0 | — | 40.0 |
| ASPARTAME** | 0.1 | 0.1 | 0.3 | 0.3 | 0.1 | 0.3 |

*Powder and/or crystalline sugar along with gum arabic may be blended with calcium carbonate, or calcium carbonate may be suspended in the sugar or dextrose syrup.
**A 1:1 sugar/aspartame syrup is prepared separately.

In Examples 17–20, gum arabic is blended in the sugar syrup. In Examples 21 and 22, gum arabic powder is dry charged after a gum arabic solution is applied in the first stages of coating, then this is followed by a hard shell coating of sugar solution or dextrose solution. The 1:1 sugar/aspartame syrup is used to improve the taste quality of the coating. The flavor is applied with coats 10 and 20. The sugar/aspartame syrup is applied with coats 15 and 25.

Gum arabic may also be used in coating of sugarless gum centers. Like sugar gum centers, the base formulation can be increased in proportion to the amount of coating applied to the center. Generally, the base level may be increased to 30–46% with the other ingredients proportionally reduced. Some typical gum formulas are in Table 4.

TABLE 4

(WEIGHT PERCENT)

|  | EX. 23 | EX. 24 | EX. 25 | EX. 26 | EX. 27 | EX. 28 | EX. 29 |
|---|---|---|---|---|---|---|---|
| GUM BASE | 35.0 | 35.0 | 30.0 | 35.0 | 30.0 | 40.0 | 30.0 |
| CALCIUM CARBONATE[b] | — | — | 5.0 | 15.0 | 10.0 | — | — |
| SORBITOL | 43.1 | 45.1 | 46.0 | 43.5 | 49.8 | 41.4 | 46.3 |
| MANNITOL | 10.0 | 10.0 | 5.0 | — | — | 8.0 | 10.0 |
| GLYCERIN | — | 8.0 | 2.0 | 3.0 | 8.0 | 2.0 | 2.0 |
| SORBITOL LIQUID | 10.0 | — | 10.0 | — | — | 6.0[a] | 10.0[a] |
| FLAVOR | 1.5 | 1.5 | 1.5 | 2.5 | 2.0 | 2.0 | 1.3 |
| ENCAPSULATED HIGH-INTENSITY SWEETENER | 0.4 | 0.4 | 0.5 | 1.0 | 0.2 | 0.6 | 0.4 |

[a]Lycasin brand hydrogenated starch hydrolyzate used instead of sorbitol liquid.
[b]This material is base filler and may not release to give an antacid effect.

In the above center formulations, the high-intensity sweetener used is aspartame. However other high-intensity sweeteners such as alitame, acesulfame K, salts of acesulfame, cyclamate and its salts, saccharin and its salts, neotame, sucralose, thaumatin, monellin, dihydrochalcone, stevioside, glycyrrhizin and combinations thereof may be used in any of the examples with the level adjusted for sweetness.

Lycasin and other polyols such as maltitol, xylitol, erythritol, lactitol and hydrogenated isomaltulose may also be used in the gum center formulations at various levels. The texture may be adjusted by varying glycerin or sorbitol liquid. Sweetness of the center formulation can also be adjusted by varying the level of high-intensity sweetener.

Calcium carbonate can be used in sugarless coatings with xylitol, sorbitol, maltitol, lactitol, hydrogenated isomaltulose and erythritol. Gum arabic acts as a binder, film former and hardener of the coated pellet. The following table gives formulas for a xylitol coating:

TABLE 5

(DRY WEIGHT PERCENT)

| | EX. 30 | EX. 31 | EX. 32 | EX. 33 | EX. 34 | EX. 35 |
|---|---|---|---|---|---|---|
| XYLITOL** | 94.6 | 92.1 | 90.5 | 50.3 | 65.2 | 48.3 |
| GUM ARABIC | 4.0 | 6.0 | 7.0 | 8.5 | 8.5 | 10.0 |
| CINNAMON FLAVOR | 0.5 | 0.5 | 0.7 | 0.7 | — | — |
| CHERRY FLAVOR | — | — | — | — | 0.9 | 1.2 |
| TITANIUM DIOXIDE | 0.5 | 0.9 | — | — | — | — |
| TALC | 0.1 | 0.1 | 0.1 | 0.1 | 0.1 | 0.1 |
| WAX | 0.1 | 0.1 | 0.1 | 0.1 | 0.1 | 0.1 |
| COLOR* | — | — | 1.4 | — | — | — |
| CALCIUM CARBONATE | — | — | — | 40.0 | 25.0 | 40.0 |
| ASPARTAME** | 0.2 | 0.3 | 0.2 | 0.3 | 0.2 | 0.3 |

*Lake color dispersed in xylitol solution.
**A 1:1 xylitol/aspartame syrup is prepared separately.

The above formulas are used to coat pellets by applying a xylitol/gum arabic syrup and the xylitol/aspartame syrup in multiple coats and air drying. Color or whitener is also mixed in the xylitol/gum arabic syrup. Calcium carbonate may be suspended in the xylitol hot syrup or added as a dry powder between syrup applications. The flavor is added in three different additions. The xylitol/aspartame syrup is applied in two additions, each at least three coating layers away from the flavor additions. After pellets have been coated and dried, talc and wax are added to give a polish.

Like xylitol, erythritol coatings also require a binder, film former, and hardener in the coating to make an acceptable product. The following formulations can be made:

TABLE 6

(DRY WEIGHT PERCENT)

| | EX. 36 | EX. 37 | EX. 38 | EX. 39 | EX. 40 | EX. 41 |
|---|---|---|---|---|---|---|
| ERYTHRITOL** | 93.5 | 91.1 | 88.9 | 49.7 | 63.1 | 45.7 |
| GUM ARABIC | 5.0 | 7.0 | 8.5 | 8.5 | 10.0 | 12.0 |
| CINNAMON FLAVOR | 0.5 | 0.4 | 0.7 | 0.7 | — | — |
| CHERRY FLAVOR | — | — | — | — | 0.9 | 1.2 |
| TITANIUM DIOXIDE | 0.5 | 0.9 | — | 0.5 | 0.5 | 0.5 |
| TALC | 0.1 | 0.1 | 0.1 | 0.1 | 0.1 | 0.1 |
| WAX | 0.1 | 0.1 | 0.1 | 0.1 | 0.1 | 0.1 |
| COLOR* | — | — | 1.4* | — | — | — |
| CALCIUM CARBONATE | — | — | — | 40.0 | 25.0 | 40.0 |
| ASPARTAME** | 0.3 | 0.4 | 0.3 | 0.4 | 0.3 | 0.4 |

*Lake color dispersed in erythritol solution.
**A 1:1 erythritol/aspartame syrup is prepared separately.

The above formulas are used to coat pellets by applying an erythritol/gum arabic syrup and an erythritol/aspartame syrup in multiple coats and air drying. Color or whitener is also mixed in the erythritol/gum arabic syrup. Calcium carbonate may be suspended in the hot erythritol syrup or added as a dry powder between syrup applications. The flavor is added in three additions. The erythritol/aspartame syrup is applied in three additions, each at least three coating layers away from the flavor additions. After pellets have been coated and dried, talc and wax are added to give a polish.

For coating formulas based on sorbitol, maltitol, lactitol and hydrogenated isomaltulose, gum arabic can be used as a binder and film former, and a crystallization modifier to help facilitate coating. Generally these polyols are more difficult to coat using only a straight syrup, but with proper technique a good smooth hard shell can be made. However, it may be preferable to add a dry charge to quicken the drying process before the pellets get too sticky. The following formulations may be used.

TABLE 7

(DRY WEIGHT PERCENT)

| | EX. 42 | EX. 43 | EX. 44 | EX. 45 | EX. 46 | EX. 47 |
|---|---|---|---|---|---|---|
| MALTITOL* | 71.5 | 54.5 | 91.3 | 91.0 | 85.1 | 52.4 |
| MALTITOL POWDER | — | — | — | 5.0 | 10.0 | 6.0 |
| GUM ARABIC | 2.0 | 4.0 | 6.0 | 2.0 | 3.0 | 4.0 |
| CINNAMON FLAVOR | 0.5 | 0.4 | — | — | — | 0.7 |
| CHERRY FLAVOR | — | — | 1.2 | 0.9 | 1.0 | — |
| TITANIUM DIOXIDE | 0.5 | 0.5 | 1.0 | 0.5 | 0.4 | 1.3 |
| TALC | 0.1 | 0.1 | 0.1 | 0.1 | 0.1 | 0.1 |
| WAX | 0.1 | 0.1 | 0.1 | 0.1 | 0.1 | 0.1 |
| CALCIUM CARBONATE | 25.0 | 40.0 | — | — | — | 35.0 |
| ASPARTAME* | 0.3 | 0.4 | 0.3 | 0.4 | 0.3 | 0.4 |

*A 1:1 maltitol/aspartame syrup is prepared separately.

Maltitol powder is used to dry charge in the early stages of coating. Maltitol, gum arabic and whitener are blended into a first coating syrup and maltitol and aspartame are blended into a second coating syrup, both of which are applied to the gum pellets. The flavor is added with coats 20 and 30. The maltitol/aspartame syrup is applied with coats 10, 15 and 25. Calcium carbonate may be applied with the first syrup suspension, preblended with powder maltitol or added as a dry charge. After all coating is applied and dried, talc and wax are added to give a polish.

In a similar manner, coatings with sorbitol, lactitol and hydrogenated isomaltulose may be made in the coating formulas in Table 7 by replacing maltitol with any one of the other polyols, and maltitol powder with the polyol powder. Like maltitol, the other polyols may become sticky during the coating and drying process, so the dry powder charge may be needed to give the proper drying. In the later stages of the coating process, less gum arabic could be used and a more pure polyol syrup could be used to give a smooth surface. Also, the dry charge would only be used in the early stages of the coating process.

In addition to dry charging with the specific polyol, other ingredients may be added to the dry charge to help absorb moisture. These materials could be inert such as talc, magnesium carbonate, starches, gums like arabinogalactan, gum talha, gum arabic or other moisture absorbing materials. Also, powdered sweeteners or flavors could be added with the dry charge.

Polyols such as sorbitol, maltitol, lactitol and hydrogenated isomaltulose are not sufficiently sweet compared to sugar or xylitol, so high-intensity sweeteners are added to the coating. Beside aspartame, other high-intensity sweeteners may also be used such as acesulfame K, salts of acesulfame, cyclamate and its salts, saccharin and its salts, alitame, sucralose, thaumatin, monellin, dihydrochalcone, glycyrrhizin, neotame, and combinations thereof. When adding calcium carbonate or other antacids, and a hot syrup is applied, heat and high pH may degrade some sweeteners if the inventive procedure were not used. In addition, stable high-intensity sweeteners may also be mixed with the first coating syrup containing the bulk sweetener.

Some typical sugar-type gum center formulations are shown in Table 8 and can be used as gum centers that may contain active medicaments. Active medicaments such as analgesics, antitussives, anesthetics, antihistamines, decongestants and antibacterial agents generally have a bitter taste. Thus, the gum or gum coating, even though it may contain sugar, will require more sweetening power to give an improved taste quality. Thus, aspartame may be added to the center of a gum formula or added to a sugar coating of the chewing gum.

TABLE 8

(WEIGHT PERCENT)

| | EX. 48 | EX. 49 | EX. 50 | EX. 51 | EX. 52 | EX. 53 |
|---|---|---|---|---|---|---|
| SUGAR | 47.9 | 47.7 | 45.5 | 39.9 | 38.7 | 35.5 |
| GUM BASE | 30.0 | 35.0 | 40.0 | 30.0 | 35.0 | 40.0 |
| CORN SYRUP | 20.0 | 15.0 | 12.0 | 18.0 | 14.0 | 12.0 |
| GLYCERIN | 1.0 | 1.0 | 1.0 | 1.0 | 1.0 | 1.0 |
| FLAVOR | 1.0 | 1.0 | 1.0 | 1.0 | 1.0 | 1.0 |
| DEXTROSE MONOHYDRATE | — | — | — | 10.0 | 10.0 | 10.0 |
| ACTIVE AGENT | 0.1 | 0.3 | 0.5 | 0.1 | 0.3 | 0.5 |

Higher levels of base may be used with a corresponding decrease in other ingredients. Also, other sugars may be used in the gum center.

Along with a possible active medicament, aspartame can then be used in the coating formula on the various pellet gum formulations. In addition, low levels of calcium carbonate can improve the quality of the gum coating. The following Table 9 shows some sugar and dextrose type formulas:

TABLE 9

(DRY WEIGHT PERCENT)

| | EX. 54 | EX. 55 | EX. 56 | EX. 57 | EX. 58 | EX. 59 |
|---|---|---|---|---|---|---|
| SUGAR* | 97.0 | 85.1 | 78.8 | 97.1 | 85.8 | 79.3 |
| GUM ARABIC | 2.0 | 3.0 | 4.0 | 2.0 | 3.0 | 4.0 |
| TITANIUM DIOXIDE | 0.5 | 1.0 | 1.0 | — | — | — |
| CALCIUM CARBONATE | — | 10.0 | 15.0 | — | 10.0 | 15.0 |
| CINNAMON FLAVOR | 0.3 | 0.5 | 0.8 | 0.5 | — | — |
| CHERRY FLAVOR | — | — | — | — | 0.8 | 1.0 |
| WAX | 0.1 | 0.1 | 0.1 | 0.1 | 0.1 | 0.1 |
| ASPARTAME* | 0.1 | 0.2 | 0.1 | 0.3 | 0.1 | 0.3 |
| ACTIVE AGENTS | — | 0.1 | 0.2 | — | 0.2 | 0.3 |

| | EX. 60 | EX. 61 | EX. 62 | EX. 63 |
|---|---|---|---|---|
| DEXTROSE MONOHYDRATE* | 97.4 | 85.0 | 92.6 | 85.85 |
| GUM ARABIC | 1.5 | 3.0 | 1.5 | 3.0 |
| TITANIUM DIOXIDE | 0.5 | 1.0 | — | — |
| CALCIUM CARBONATE | — | 10.0 | 5.0 | 10.0 |
| CINNAMON FLAVOR | 0.3 | 0.5 | — | — |
| CHERRY FLAVOR | — | — | 0.6 | 0.8 |
| WAX | 0.1 | 0.1 | 0.1 | 0.1 |
| ASPARTAME* | 0.2 | 0.2 | 0.2 | 0.2 |
| ACTIVE AGENTS | — | 0.2 | — | 0.05 |

*A 1:1 sugar/aspartame syrup is prepared separately.
*A 1:1 dextrose monohydrate/aspartame syrup is prepared separately.

The above formulations are made by making a first syrup by dissolving the sugar and gum arabic in solution at about 75% solids at boiling, and suspending titanium dioxide and/or calcium carbonate in this syrup. A second syrup is made with the sugar and aspartame at room temperature. These two syrups can be applied sequentially or simultaneously. Flavor is not mixed with the hot syrup, but added with coats 10, 20 and 30. The sugar/aspartame and dextrose monohydrate/aspartame syrups are applied with coats 15 and 25. After the final coats are applied and dried, wax is applied to give a smooth polish.

The above process gives a hard shell coating. Often a dry charge of powdered sugar or dextrose monohydrate may be used. This gives a somewhat softer coating. A dry charge may be used to build up a coating, but then finished with a straight syrup to obtain a hard shell. Table 10 gives these types of formulas.

TABLE 10

(DRY WEIGHT PERCENT)

| | EX. 64 | EX. 65 | EX. 66 | EX. 67 | EX. 68 | EX. 69 |
|---|---|---|---|---|---|---|
| SUGAR* | 87.3 | 91.2 | — | — | 72.0 | — |
| DEXTROSE MONOHYDRATE* | — | — | 87.0 | 91.1 | — | 71.5 |
| POWDER SUGAR* | 10.0 | 5.0 | — | — | 10.0 | — |
| POWDER DEXTROSE* | — | — | 10.0 | 5.0 | — | 5.0 |
| GUM ARABIC POWDER* | 2.0 | 3.0 | 2.0 | 3.0 | 8.0 | 8.0 |
| GUM ARABIC SOLUTION | — | — | — | — | 4.0 | 4.0 |
| CINNAMON FLAVOR | 0.4 | 0.5 | 0.4 | 0.6 | 0.4 | 0.8 |

TABLE 10-continued (DRY WEIGHT PERCENT)

| | EX. 64 | EX. 65 | EX. 66 | EX. 67 | EX. 68 | EX. 69 |
|---|---|---|---|---|---|---|
| WAX | 0.1 | 0.1 | 0.1 | 0.1 | 0.1 | 0.1 |
| CALCIUM CARBONATE | — | — | — | — | 5.0 | 10.0 |
| ASPARTAME** | 0.2 | 0.2 | 0.4 | 0.2 | 0.2 | 0.4 |
| ACTIVE AGENTS | — | — | 0.1 | — | 0.3 | 0.2 |

*Powder and/or crystalline sugar, dextrose monohydrate or powder dextrose, along with gum arabic, may be blended with calcium carbonate, or calcium carbonate may be suspended in the sugar or dextrose syrup.
**A 1:1 sugar/aspartame syrup is prepared separately.

In Examples 64–67, gum arabic is blended in the sugar syrup. In Examples 68 and 69, gum arabic powder is dry charged after a gum arabic solution is applied in the first stages of coating, then this is followed by a hard shell coating of sugar solution or dextrose solution. In all of the examples, the flavor is applied at coats 10, 20 and 30. The sugar/aspartame syrup is applied with coats 5, 15 and 25.

Gum arabic may also be used in coating of sugarless gum centers. Like sugar gum centers, the base formulation can be increased in proportion to the amount of coating applied to the center. Formulations similar to those found in previous tables for low and high moisture gum can be used to make gum centers. Generally, the base level may be increased to 30–46% with the other ingredients proportionally reduced. Some typical gum formulas are in Table 11.

TABLE 11

(DRY WEIGHT PERCENT)

| | EX. 70 | EX. 71 | EX. 72 | EX. 73 | EX. 74 | EX. 75 | EX. 76 |
|---|---|---|---|---|---|---|---|
| GUM BASE | 33.0 | 35.0 | 30.0 | 30.0 | 33.0 | 40.0 | 30.0 |
| CALCIUM CARBONATE* | 13.0 | — | 5.0 | 10.0 | 13.0 | — | — |
| SORBITOL | 46.5 | 44.5 | 45.3 | 40.2 | 43.66 | 41.7 | 46.5 |
| MANNITOL | — | 10.0 | 5.0 | 10.0 | — | 8.0 | 10.0 |
| GLYCERIN | 4.0 | 8.0 | 2.0 | — | 8.0 | 2.0 | 2.0 |
| SORBITOL LIQUID | — | — | 10.0 | 8.0 | — | 6.0 a) | 10.0 a) |
| FLAVOR | 2.3 | 1.5 | 1.5 | 1.5 | 2.2 | 2.0 | 1.3 |
| ENCAPSULATED HIGH-INTENSITY SWEETENER | 0.8 | 0.6 | 0.8 | 0.3 | 0.14 | 0.3 | 0.2 |
| LECITHIN | 0.4 | 0.4 | 0.4 | — | — | — | — | a) Lycasin brand hydrogenated starch hydrolyzate used instead of sorbitol liquid
*This material is base filler and may not release to give an antacid effect.

In the above center formulations, the high-intensity sweetener used is aspartame. However other high-intensity sweeteners such as alitame, acesulfame K, salts of acesulfame, cyclamate and its salts, saccharin and its salts, neotame, sucralose, thaumatin, monellin, dihydrochalcone, stevioside, glycyrrhizin and combinations thereof may be used in any of the examples with the level adjusted for sweetness.

Lycasin and other polyols such as maltitol, xylitol, erythritol, lactitol and hydrogenated isomaltulose may also be used in the gum center formulations at various levels similar to those shown previously. The texture may be adjusted by varying glycerin or sorbitol liquid. Sweetness of the center formulation can also be adjusted by varying the level of high-intensity sweetener.

Low levels of calcium carbonate can be used in sugarless coatings with xylitol, sorbitol, maltitol, lactitol, hydrogenated isomaltulose and erythritol. Gum arabic acts as a binder, film former and hardener of the coated pellet. The following table gives formulas for a xylitol coating:

TABLE 12

(DRY WEIGHT PERCENT)

| | EX. 77 | EX. 78 | EX. 79 | EX. 80 | EX. 81 | EX. 82 |
|---|---|---|---|---|---|---|
| XYLITOL | 94.7 | 91.8 | 90.6 | 80.4 | 73.4 | 79.1 |
| GUM ARABIC | 4.0 | 6.0 | 7.0 | 8.5 | 9.2 | 10.0 |
| CHRRY FLAVOR | 0.5 | 1.0 | 0.7 | 0.7 | 1.2 | 0.5 |
| TITANIUM DIOXIDE | 0.5 | 0.9 | — | — | 0.8 | — |
| TALC | 0.1 | 0.1 | 0.1 | 0.1 | 0.1 | 0.1 |
| WAX | 0.1 | 0.1 | 0.1 | 0.1 | 0.1 | 0.1 |
| COLOR* | — | — | 1.4 | — | — | — |
| CALCIUM CARBONATE | — | — | — | 10.0 | 15.0 | 10.0 |
| ASPARTAME** | 0.1 | 0.1 | 0.1 | 0.2 | 0.2 | 0.2 |

*Lake color dispersed in xylitol solution.
**A 1:1 xylitol/aspartame syrup is prepared separately.

The above formulas are used to coat pellets by applying a xylitol/gum arabic syrup and a xylitol/aspartame syrup in multiple coats and air drying. Color or whitener is also mixed in the xylitol/gum arabic syrup. The flavor is applied with coats 20 and 30. The xylitol/aspartame syrup is applied with coats 10 and 15. Calcium carbonate may be suspended in the xylitol hot syrup. After pellets have been coated and dried, talc and wax are added to give a polish.

Like xylitol, erythritol coatings also require a binder, film former and hardener in the coating to make an acceptable product. The following formulations can be made:

TABLE 13

(DRY WEIGHT PERCENT)

| | EX. 83 | EX. 84 | EX. 85 | EX. 86 | EX. 87 | EX. 88 |
|---|---|---|---|---|---|---|
| ERYTHRITOL* | 93.1 | 91.2 | 88.8 | 79.9 | 73.1 | 76.4 |
| GUM ARABIC | 5.0 | 7.0 | 8.5 | 8.5 | 10.0 | 12.0 |
| CHRRY FLAVOR | 1.0 | 0.4 | 0.7 | 0.7 | — | — |

TABLE 13-continued (DRY WEIGHT PERCENT)

| | EX. 83 | EX. 84 | EX. 85 | EX. 86 | EX. 87 | EX. 88 |
|---|---|---|---|---|---|---|
| CINNAMON FLAVOR | — | — | — | — | 0.9 | 0.5 |
| TITANIUM DIOXIDE | 0.5 | 0.9 | — | 0.5 | 0.5 | 0.5 |
| TALC | 0.1 | 0.1 | 0.1 | 0.1 | 0.1 | 0.1 |
| WAX | 0.1 | 0.1 | 0.1 | 0.1 | 0.1 | 0.1 |
| COLOR | — | — | 1.4 | — | — | — |
| CALCIUM CARBONATE | — | — | — | 10.0 | 15.0 | 10.0 |
| ASPARTAME* | 0.2 | 0.3 | 0.4 | 0.2 | 0.3 | 0.4 |

*A 1:1 erythritol/aspartame syrup is prepared separately.

The above formulas are used to coat pellets by applying an erythritol/gum arabic syrup and an erythritol/aspartame syrup in multiple coats and air drying. Color or whitener is also mixed in the erythritol/gum arabic syrup. The flavor is applied with coats 20 and 30. The erythritol/aspartame syrup is applied with coats 10, 15 and 25. Calcium carbonate may be suspended in the hot erythritol syrup. After pellets have been coated and dried, talc and wax are added to give a polish.

For coating formulas based on sorbitol, maltitol, lactitol and hydrogenated isomaltulose, gum arabic can be used as a binder and film former, and a crystallization modifier to help facilitate coating. Generally these polyols are more difficult to coat using only a straight syrup, but with proper technique a good smooth hard shell can be made. However, it may be preferable to add a dry charge to quicken the drying process before the pellets get to sticky. The following formulations may be used.

TABLE 14

(DRY WEIGHT PERCENT)

| | EX. 89 | EX. 90 | EX. 91 | EX. 92 | EX. 93 | EX. 94 | EX. 95 |
|---|---|---|---|---|---|---|---|
| MALTITOL* | 91.6 | 84.6 | 76.8 | 71.6 | 63.8 | 54.1 | 64.5 |
| MALTITOL POWDER | 5.0 | 10.0 | 15.0 | 12.0 | 12.0 | 12.0 | 12.0 |
| GUM ARABIC | 2.0 | 4.0 | 6.0 | 5.0 | 5.0 | 7.0 | 8.0 |
| CHERRY-MINT FLAVOR | 0.5 | 0.4 | 0.7 | 0.5 | 0.3 | 0.7 | 1.3 |
| TITANIUM DIOXIDE | 0.5 | 0.5 | 1.0 | 0.5 | 0.4 | 0.6 | 0.7 |
| TALC | 0.1 | 0.1 | 0.1 | 0.1 | 0.1 | 0.1 | 0.1 |
| WAX | 0.1 | 0.1 | 0.1 | 0.1 | 0.1 | 0.1 | 0.1 |
| CALCIUM CARBONATE | — | — | — | 10.0 | 18.0 | 25.0 | 13.0 |
| ASPARTAME* | 0.2 | 0.3 | 0.3 | 0.2 | 0.3 | 0.4 | 0.3 |

*A 1:1 aspartame/maltitol syrup is applied as a separate coating syrup or a 1:2 aspartame/maltitol syrup is added to the coating syrup just before being applied.

Maltitol powder is used to dry charge in the early stages of coating. Maltitol, gum arabic and whitener are blended into a first coating syrup. A second coating syrup containing aspartame and maltitol is made as a separate syrup. In examples 89–91 the second syrup is mixed with the first syrup just before it is applied to pellets. In example 92–94, the second coating syrup is added separately but while the first coating syrup is wet. The flavor is added with different coats of the first coating syrup so as to be at least three coating layers away from any coating layer that contains aspartame. Calcium carbonate is applied as part of the first syrup suspension. After all coating is applied and dried, talc and wax are added to give a polish.

Gum pellets having a composition shown in Example 70 are coated with maltitol according to the coating formula in Example 95. The coating is built up from the application of three different coating syrups and maltitol powder. One coating syrup includes aspartame as a high-intensity sweeter. The aspartame coating syrup is prepared as follows, and is designated syrup A:

1. 4.98 kg warm water (about 95–104° F., 35–40° C.) is used for making the mixture. No further heat is required.
2. 1.81 kg of maltitol powder is added and mixed until dissolved. The solution temperature is verified as dropping to 81° F. (27° C.) or below.
3. 1.81 kg aspartame is added to the solution and agitated until dispersed.
4. 0.45 kg of a 40% gum talha solution is added to the aspartame/maltitol mix.
5. The resulting syrup is held at ambient conditions up to 8 hours until used.

Two additional syrups, designated B and C, are made up according to the following composition and held at 167° F. (75° C.).

| | SYRUP B, KG | SYRUP C, KG |
|---|---|---|
| WATER | 68.0 | 92.0 |
| MALTITOL | 314.4 | 293.6 |
| 40% GUM TALHA SOLUTION | 116.0 | 52.0 |
| TITANIUM DIOXIDE | 5.0 | 5.0 |
| CALCIUM CARBONATE | 64.6 | 56.4 |
| TARGET BRIX | 72 | 71 |

Syrup B is applied in the first 12 coating applications, followed by the application of maltitol powder after each syrup coat to assist dryness. In each of coats 13–16, a first half portion of syrup B is applied, followed by the aspartame/maltitol syrup A, then the second portion of syrup B. This is repeated four times, comprising coats 13–16. After liquid is applied, maltitol powder is applied for dryness. After this, syrup B is used by itself, with no powder maltitol. Flavor is applied on coats 21, 30, and 40. After all of the flavor is applied, syrup C is used to finish the coating in 10 more coating applications. The 1.0 gram centers are coated to a finish piece weight of 1.52 grams and polished with carnauba wax and talc.

In another example, gum pellets of Example 70 are coated with maltitol according to the coating formula in Example 95. The aspartame coating syrup D is prepared as follows:

1. 1.81 kg aspartame is added to 5.43 kg room temperature water (about 77° F., 25° C.) and mixed until the aspartame is uniformly dispersed.
2. 3.62 kg of powdered maltitol is blended in until uniform.

The following two coating syrups E and F are prepared according to the following formula and held at 167° F. (75° C.).

| | SYRUP E, KG | SYRUP F, KG |
|---|---|---|
| WATER | 64.5 | 96.0 |
| MALTITOL | 213.0 | 222.0 |
| 40% GUM TALHA SOLUTION | 70.0 | 40.0 |
| TITANIUM DIOXIDE | 1.92 | 1.92 |
| CALCIUM CARBONATE | 43.0 | 43.0 |
| TARGET BRIX | 70 | 69 |

Syrup E is applied in the first five coating applications followed by the application of maltitol powder after each syrup coat. In a special holding tank, at 167° F. (75° C.), all of the aspartame/maltitol syrup D is added to 60 kg of syrup E and this combined syrup is used in the next five syrup coating applications, again followed by maltitol powder after each application. Each application is dried in 6 minutes. Thus all syrup D is applied within 30 minutes of being mixed with syrup E. Another nine coats of syrup E are then applied, each coating of syrup being followed by maltitol powder. Syrup E is used for coats 20–26, but no maltitol powder is added. Flavor is added with coats 20, 22 and 28. Syrup F is used starting with coat 27. A 1.0 gum center is coated to 1.52 grams and polished with wax and talc.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

The invention claimed is:

1. A method of making coated chewing gum products comprising the steps of:
   a) providing chewing gum cores;
   b) providing a first coating syrup comprising a bulk sweetener, the first coating syrup being free of dipeptide sweetener;
   c) providing an aldehyde flavor;
   d) providing a second coating syrup separate from the first coating syrup and comprising a dipeptide sweetener, the level of dipeptide sweetener providing a perceptible sweetness;
   e) applying the first and second coating syrups to produce a chewing gum coating on the cores, and applying the aldehyde flavor so that it is incorporated into the coating and such that all of the dipeptide sweetener in the coating is separated from the aldehyde flavor by one or more dried layers of first syrup constituting at least 2% by weight of the core.

2. The method of claim 1 wherein the first coating syrup further comprises an antacid.

3. The method of claim 2 wherein the antacid comprises between about 5% and about 50% of the total solids in the first coating syrup.

4. The method of claim 1 wherein the first and second coating syrups are held in separate tanks prior to being applied to the cores.

5. The method of claim 3 wherein the first and second coating syrups are mixed together in at least one coating application just prior to being applied to the cores.

6. The method of claim 1 wherein the first and second coating syrups are applied to the cores at separate times.

7. The method of claim 1 wherein the first coating syrup is held for use in the coating process at a temperature of at least 130° F. (54° C.).

8. The method of claim 1 wherein the dipeptide sweetener is a dipeptide sweetener that would degrade by at least 5% if mixed into the first coating syrup and held at a temperature of at least 167° F. (75° C.) for a period of at least 7 hours.

9. The method of claim 1 wherein the second coating syrup is held for use in the coating process at an average temperature of less than 90° F.(32° C.).

10. The method of claim 1 wherein the dipeptide sweetener is selected from the group consisting of aspartame, alitame, neotame and mixtures thereof.

11. The method of claim 1 wherein the second coating syrup further comprises a bulk sweetener.

12. The method of claim 11 wherein the ratio of the bulk sweetener to the dipeptide sweetener in the second coating syrup is between about 5:1 and about 1:5.

13. The method of claim 11 wherein the bulk sweetener in the second coating syrup comprises a polyol.

14. The method of claim 1 wherein the bulk sweetener in the first coating syrup comprises sucrose.

15. The method of claim 1 wherein the bulk sweetener in the first coating syrup comprises a polyol.

16. The method of claim 15 wherein the polyol is selected from the group consisting of xylitol, maltitol, sorbitol, hydrogenated isomaltulose, erythritol and combinations thereof.

17. The method of claim 1 wherein the dipeptide sweetener comprises between about 20% and about 80% of the total solids in the second coating syrup.

18. The method of claim 1 wherein the bulk sweetener in the first coating syrup comprises a polyol, and the dipeptide sweetener in the second coating syrup comprises aspartame.

19. The method of claim 1 wherein the first coating syrup is held at an average temperature of at least 150° F.(66° C.) for an average period of at least 2 hours before being applied to the cores.

20. The method of claim 1 wherein the second coating syrup is held for an average period of less than 4 hours before being applied to the cores.

21. The method of claim 1 wherein the coating is sugarless.

22. The method of claim 1 wherein the dipeptide sweetener is not encapsulated.

23. The method of claim 1 wherein the dipeptide sweetener comprises aspartame.

24. The method of claim 1 wherein a third coating syrup separate from both the first and second coating syrups and comprising a bulk sweetener is provided and applied to the cores to produce the coating.

25. The method of claim 1 wherein a powdered bulk sweetener is applied to the cores after application of syrup.

26. The method of claim 1 wherein a portion of the first coating syrup is applied to the cores, followed by application of the second coating syrup, followed by further application of the first coating syrup.

27. The method of claim 1 wherein the aldehyde flavor is mixed into some portions of the first syrup before said portions are applied.

28. The method of claim 1 wherein the aldehyde flavor is applied separately but at the same time that at least a portion of the first syrup is applied.

29. The method of claim 1 wherein the first coating syrup is applied in a series of aliquots and the aldehyde flavor is applied between applications of aliquots of the first syrup.

30. The method of claim 1 wherein the second coating syrup comprises a suspension syrup.

31. The method of claim 1 wherein the aldehyde flavor is selected from the group consisting of cinnamon, cherry, vanilla, lemon, orange, strawberry, apple, grape, peach and mixtures thereof.

32. The method of claim 1 wherein an additional flavor is also included in the coating beside the aldehyde flavor.

33. The method of claim 1 wherein the aldehyde flavor is separated from the second coating syrup by one or more dried layers of first syrup constituting about 3% or more by weight of the core.

34. A method of making coated chewing gum products comprising the steps of:
   a) providing chewing gum cores;
   b) providing a first coating syrup comprising a bulk sweetener and holding the first coating syrup at an average temperature of at least 100° F.(38° C.);
   c) providing an aldehyde flavor;
   d) providing a second coating syrup containing a dipeptide sweetener separate from the first coating syrup and holding the second coating syrup at an average temperature of less than 90 F.(32° C.);
   e) applying the first and second coating syrups to produce a coating on the cores, and applying the aldehyde flavor so that it is separated from the second coating syrup by one or more dried layers of first syrup constituting at least 2% by weight of the core.

35. The method of claim 34 wherein the first coating syrup is essentially free of dipeptide sweetener.

36. The method of claim 34 wherein the one or more dried layers of first syrup constitute at least 3% by weight of the core.

37. The method of claim 34 wherein the one or more dried layers of first coating syrup constituting the at least 2% by weight of the core include powder material applied to help dry the first syrup.

* * * * *